Jan. 16, 1934.  H. V. SCHIEREN  1,944,111

APPARATUS FOR PRODUCING DESIGNS

Filed April 22, 1931

WITNESSES
Edw. Thorpe
E. B. Marshall

INVENTOR
H. V. Schieren
BY Munn & Co
ATTORNEY

Patented Jan. 16, 1934

1,944,111

UNITED STATES PATENT OFFICE 1,944,111

APPARATUS FOR PRODUCING DESIGNS

Harrie V. Schieren, Montclair, N. J.

Application April 22, 1931. Serial No. 532,082

1 Claim. (Cl. 88—24)

An object of the invention is to provide an apparatus for making designs in which images of a single design are reflected around a center by a plurality of mirrors and to a lens of a camera to photographically produce a design which is a composite of the images of the said single design.

Another object of the invention is to provide a tube with an inner reflecting surface or surfaces, the tube having one end disposed at a lens of a camera to reflect images of an object disposed in front of the other end of the tube to the camera lens at a plurality of angles and thereby make possible the production of a composite photograph of the said images of the object. Preferably the tube is angular in cross-section, with each inner side of the tube having a reflector.

Still another object of the invention is to secure a translucent member with a design on the end of the tube, images of designs being reflected by the inner walls of the tube to the lens of the camera. The lens and the camera may be arranged to enlarge the composite design as may be desired.

A further object of the invention is to provide a convenient and inexpensive device for making designs for wall papers, fabrics, textiles, and other goods.

Additional objects of the invention will appear in the following specification in which the preferred form of the invention is described.

Figure 1:
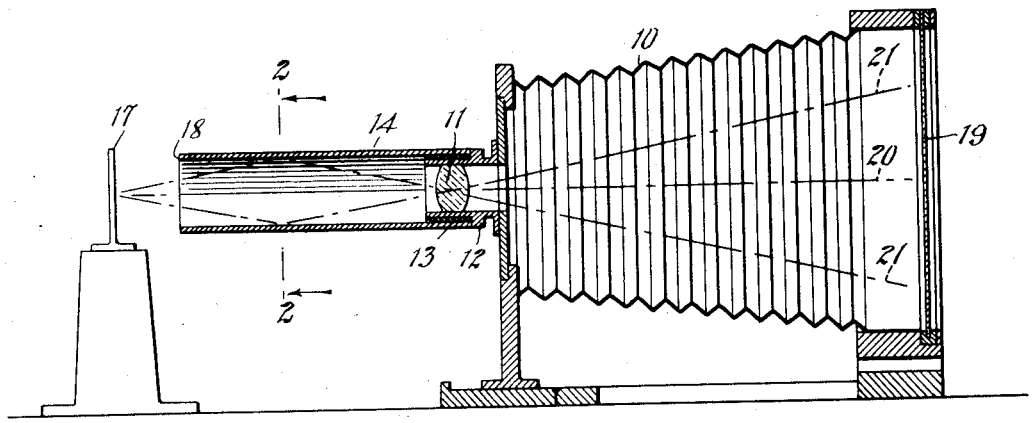
Figure 2:
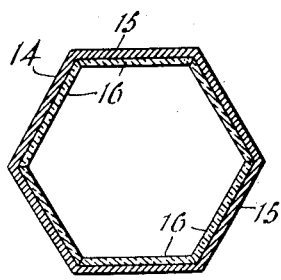
Figure 4:
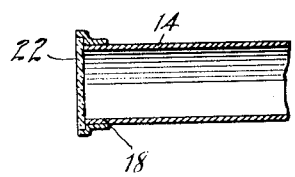
Figure 3:
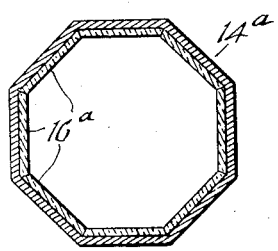

In the drawing similar reference characters refer to similar parts in all the views, of which Figure 1 is a side sectional elevation illustrating the invention, Figure 2 is an enlarged sectional view on the line 2—2 of Figure 1, Figure 3 is an enlarged transverse sectional view of another form of the tube having eight sides with eight reflectors, Figure 4 is a sectional fragmentary view illustrating the manner in which a design may be arranged on a translucent member secured to the outer end of the tube.

By referring to the drawing it will be seen that a camera 10 of the usual form is provided, the said camera having a lens 11 and there being secured to the lens barrel 12 an end 13 of a tube 14. This tube 14, which is shown in cross-section in Figure 2 of the drawing, is angular and each of its sides 15 has a reflecting surface 16 so that light rays from an object 17 disposed in front of the outer end 18 of the tube 14 will be reflected against the inner reflecting surfaces 16 of the tube 14 to direct the light rays to the lens 11 at a plurality of angles to form a plurality of images around a central point at a film or plate 19 at the rear of the camera 10. In addition to these images, which will be disposed around a central point at the film or plate 19, there will, of course, be a central image along the central line 20 formed by the light rays passing directly from the object 17 to the lens 11. These light rays at the central line 20 will reproduce an image of the object at the film or plate 19 and images will be disposed around this central image, as indicated by the lines 21, the images around the central image corresponding with the number of reflecting surfaces 16 in the tube 14.

Reverting to the mounting of the tube 14 on the lens barrel 12, it is desired to point out that this particular mounting occurs in a camera and kaleidoscopic tube combination. It is true that this type of mounting may be useful in other combinations, but in this particular instance it has the advantage of not only firmly supporting the tube 14 but holding it true to the optical axis of the lens 11.

The lens barrel 12 has an annulus rather close to the camera front. This leaves an ample portion of the barrel for the fitting on of a friction washer. This friction washer is substantially between the annulus and the forward end of the barrel, and it is on this washer that the tube 14 is fitted until it abuts the annulus.

It will be understood that the lens and the tube may be arranged, together with the object, to produce a desired composite design with the plurality of images disposed around the central image.

As illustrated in Figure 4 of the drawing, a translucent member 22 may be secured to the end of the tube 14 and a design may be indicated on this translucent member 22 so that the light rays passing through the translucent member will be reflected against the inner reflecting sides 16 of the tube 14 in the manner set forth.

In Figure 2 of the drawing, there is shown a tube with six reflecting surfaces disposed at angles to each other. In Figure 3 there is shown a cross-section of a tube 14ª with eight reflecting surfaces 16ª which are disposed at angles to each other. However, it will be understood that any desired number of reflecting surfaces may be disposed at the inner sides of the tube 14ª to produce any desired effect.

What is claimed is:

In a camera and kaleidoscopic tube combination, means for mounting the tube on the front of the camera, said means comprising a lens barrel having a lens, an annulus on the outside of the barrel situated closer to the camera front than to the forward end of the barrel, and a friction washer on the lens barrel substantially between said annulus and the forward end of the barrel receiving the tube and supporting it in the optical axis of the lens.

HARRIE V. SCHIEREN.